(12) United States Patent
Sugime

(10) Patent No.: US 11,223,428 B2
(45) Date of Patent: *Jan. 11, 2022

(54) POWER OVER FIBER SYSTEM

(71) Applicant: KYOCERA Corporation, Kyoto (JP)

(72) Inventor: Tomonori Sugime, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/128,197

(22) Filed: Dec. 21, 2020

(65) Prior Publication Data

US 2021/0111813 A1   Apr. 15, 2021

Related U.S. Application Data

(63) Continuation of application No. 16/902,271, filed on Jun. 16, 2020, now Pat. No. 10,911,157.

(30) Foreign Application Priority Data

Aug. 2, 2019   (JP) .............................. JP2019-142683

(51) Int. Cl.
*H04B 10/00*   (2013.01)
*H04B 10/80*   (2013.01)
(Continued)

(52) U.S. Cl.
CPC .......... *H04B 10/807* (2013.01); *H04B 10/116* (2013.01); *H04B 10/40* (2013.01)

(58) Field of Classification Search
CPC .... H04B 10/807; H04B 10/40; H04B 10/806; H04B 10/808; H04B 10/25; H04B 10/2507; H04J 14/02
(Continued)

(56) References Cited

U.S. PATENT DOCUMENTS 7,359,647 B1   4/2008 Faria et al.
8,358,893 B1 *   1/2013 Sanderson ........... G02B 6/4415
385/101
(Continued)

FOREIGN PATENT DOCUMENTS

JP   2010135989 A   6/2010
JP   20151925 A   1/2015

*Primary Examiner* — Hanh Phan
(74) *Attorney, Agent, or Firm* — Hauptman Ham, LLP

(57) ABSTRACT

A power over fiber system includes: a first data communication device including a power sourcing equipment device; a second data communication device including a photoelectric-conversion-and-optical-communication unit including a powered device; and an optical fiber cable. The first data communication device is capable of controlling low power supply and high power supply of the power sourcing equipment device. Feed electric power by the high power supply exceeds that by the low power supply. The first data communication device enables the high power supply after starting the low power supply to the second data communication device and receiving, therefrom, a signal indicating that the photoelectric-conversion-and-optical-communication unit has started. The photoelectric-conversion-and-optical-communication unit starts and transmits the signal to the first data communication device when receiving the low power supply, and enables extension of a range of a target that receives electric power from the powered device when receiving the high power supply.

2 Claims, 6 Drawing Sheets

(51) Int. Cl.
*H04B 10/116* (2013.01)
*H04B 10/40* (2013.01)

(58) Field of Classification Search
USPC ....... 398/171, 140, 141, 135, 136, 137, 138, 398/139, 158, 159, 33, 38, 162, 79
See application file for complete search history.

(56) References Cited

U.S. PATENT DOCUMENTS

| | | | |
|---|---|---|---|
| 10,911,157 B1* | 2/2021 | Sugime | H04B 10/116 |
| 2009/0016715 A1* | 1/2009 | Furey | H04B 10/807 |
| | | | 398/38 |
| 2019/0213871 A1* | 7/2019 | Mark | H04B 10/40 |

* cited by examiner

POWER OVER FIBER SYSTEM

CROSS-REFERENCE TO RELATED APPLICATIONS

This application is a continuation of U.S. patent application Ser. No. 16/902,271 filed on Jun. 16, 2020 and is based upon and claims the benefit of priority from the prior Japanese Patent Application No. 2019-142683, filed on Aug. 2, 2019, the entire contents of which are incorporated herein by reference.

BACKGROUND

Technical Field

The present disclosure relates to optical power supply.

Description of Related Art

Recently, there has been studied an optical power supply system that converts electric power into light called feed light, transmits the feed light, converts the feed light into electric energy, and uses the electric energy as electric power.

There is disclosed in JP 2010-135989 A an optical communication device that includes: an optical transmitter that transmits signal light modulated with an electric signal and feed light for supplying electric power; an optical fiber including a core that transmits the signal light, a first cladding that is formed around the core, has a refractive index lower than that of the core, and transmits the feed light, and a second cladding that is formed around the first cladding, and has a refractive index lower than that of the first cladding; and an optical receiver that operates with electric power obtained by converting the feed light transmitted through the first cladding of the optical fiber, and converts the signal light transmitted through the core of the optical fiber into the electric signal.

SUMMARY

In optical power supply, optical transmission of higher energy is expected.

When a transmission path of feed light from the power supplying side to the power receiving side is not properly connected, and a power sourcing equipment device outputs high-power feed light, the feed light may be released to the outside, and people or objects may be irradiated with the high-power feed light.

Further, optical power supply is requested to be performed with a proper balance between the amount of power to supply (power supply amount) and the amount of power to be received and consumed (power consumption).

According to an aspect of the present disclosure, there is provided a power over fiber system including:

a first data communication device including a power sourcing equipment device including a semiconductor laser that oscillates with electric power, thereby outputting feed light;

a second data communication device including a powered device including a photoelectric conversion element that converts the feed light into electric power, the second data communication device performing optical communication with the first data communication device; and an optical fiber cable including a first end connectable to the first data communication device and a second end connectable to the second data communication device to transmit the feed light and signal light, wherein the first data communication device is capable of controlling low power supply and high power supply that are performed by the power sourcing equipment device, feed electric power by the high power supply exceeding feed electric power by the low power supply, wherein the first data communication device enables the high power supply after starting the low power supply to the second data communication device and receiving, from the second data communication device, a start signal indicating that a photoelectric-conversion-and-optical-communication unit of the second data communication device has started, and wherein the photoelectric-conversion-and-optical-communication unit includes the powered device, and starts and transmits the start signal to the first data communication device when receiving the low power supply, and enables extension of a range of a target that receives electric power from the powered device when receiving the high power supply.

BRIEF DESCRIPTION OF THE DRAWINGS

The accompanying drawings are not intended as a definition of the limits of the invention but illustrate embodiments of the invention, and together with the general description given above and the detailed description of the embodiments given below, serve to explain the principles of the invention, wherein.

DETAILED DESCRIPTION OF EMBODIMENTS

Hereinafter, one or more embodiments of the present disclosure will be described with reference to the drawings. However, the scope of the present invention is not limited to the disclosed embodiments or illustrated examples.

(1) Outline of System

First Embodiment

Figure 1:
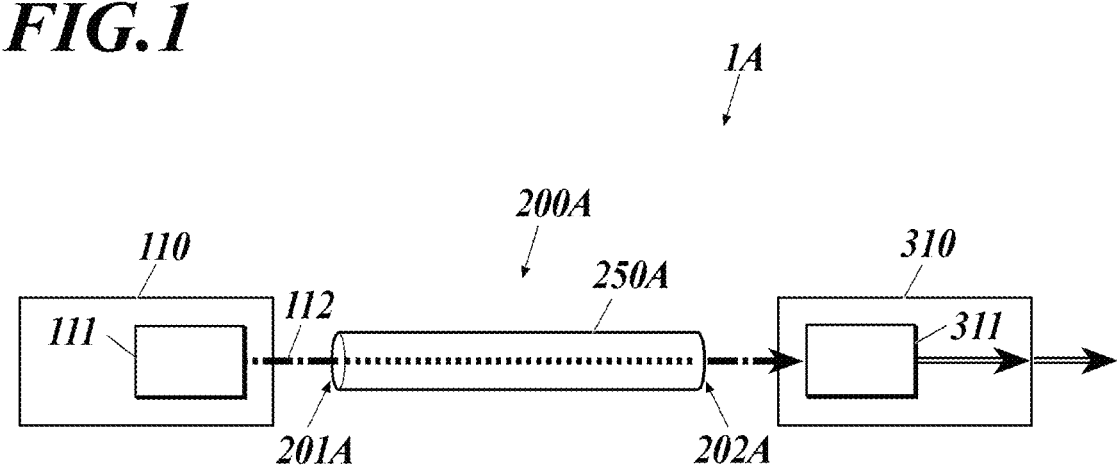
FIG. 1 is a block diagram of a power over fiber system according to a first embodiment of the present disclosure.

As shown in FIG. 1, a power over fiber (PoF) system 1A (optical power supply system) of this embodiment includes a power sourcing equipment (PSE) device 110, an optical fiber cable 200A and a powered device (PD) 310.

In the present disclosure, a PSE device converts electric power into optical energy and supplies (sources) the optical energy, and a powered device receives (draws) the supplied optical energy and converts the optical energy into electric power.

The PSE device 110 includes a semiconductor laser 111 for power supply.

The optical fiber cable 200A includes an optical fiber 250A that forms a transmission path of feed light.

The powered device 310 includes a photoelectric conversion element 311.

The PSE device 110 is connected to a power source, and electrically drives the semiconductor laser 111 and so forth.

The semiconductor laser 111 oscillates with the electric power from the power source, thereby outputting feed light 112.

The optical fiber cable 200A has one end 201A (first end) connectable to the PSE device 110 and the other end 202A (second end) connectable to the powered device 310 to transmit the feed light 112.

The feed light 112 from the PSE device 110 is input to the one end 201A of the optical fiber cable 200A, propagates through the optical fiber 250A, and is output from the other end 202A of the optical fiber cable 200A to the powered device 310.

The photoelectric conversion element 311 converts the feed light 112 transmitted through the optical fiber cable 200A into electric power. The electric power obtained by the conversion of the feed light 112 by the photoelectric conversion element 311 is driving power needed in the powered device 310. The powered device 310 is capable of outputting, for an external device(s), the electric power obtained by the conversion of the feed light 112 by the photoelectric conversion element 311.

Semiconductor materials of semiconductor regions of the semiconductor laser 111 and the photoelectric conversion element 311 are semiconductors having a laser wavelength being a short wavelength of 500 nm or less. The semiconductor regions exhibit light-electricity conversion effect.

Semiconductors having a laser wavelength being a short wavelength have a large band gap and a high photoelectric conversion efficiency, and hence improve photoelectric conversion efficiency at the power supplying side (PSE side) and the power receiving side (PD side) in optical power supply, and improve optical power supply efficiency.

Hence, as the semiconductor materials, laser media having a laser wavelength (base wave) of 200 nm to 500 nm may be used. Examples thereof include diamond, gallium oxide, aluminum nitride and gallium nitride.

Further, as the semiconductor materials, semiconductors having a band gap of 2.4 eV or greater are used.

For example, laser media having a band gap of 2.4 eV to 6.2 eV may be used. Examples thereof include diamond, gallium oxide, aluminum nitride and gallium nitride.

Laser light having a longer wavelength tends to have a higher transmission efficiency, whereas laser light having a shorter wavelength tends to have a higher photoelectric conversion efficiency. Hence, when laser light is transmitted for a long distance, laser media having a laser wavelength (base wave) of greater than 500 nm may be used, whereas when the photoelectric conversion efficiency is given priority, laser media having a laser wavelength (base wave) of less than 200 nm may be used.

Any of these semiconductor materials may be used in one of the semiconductor laser 111 and the photoelectric conversion element 311. This improves the photoelectric conversion efficiency at either the PSE side or the PD side, and improves the optical power supply efficiency.

Second Embodiment

Figure 2:
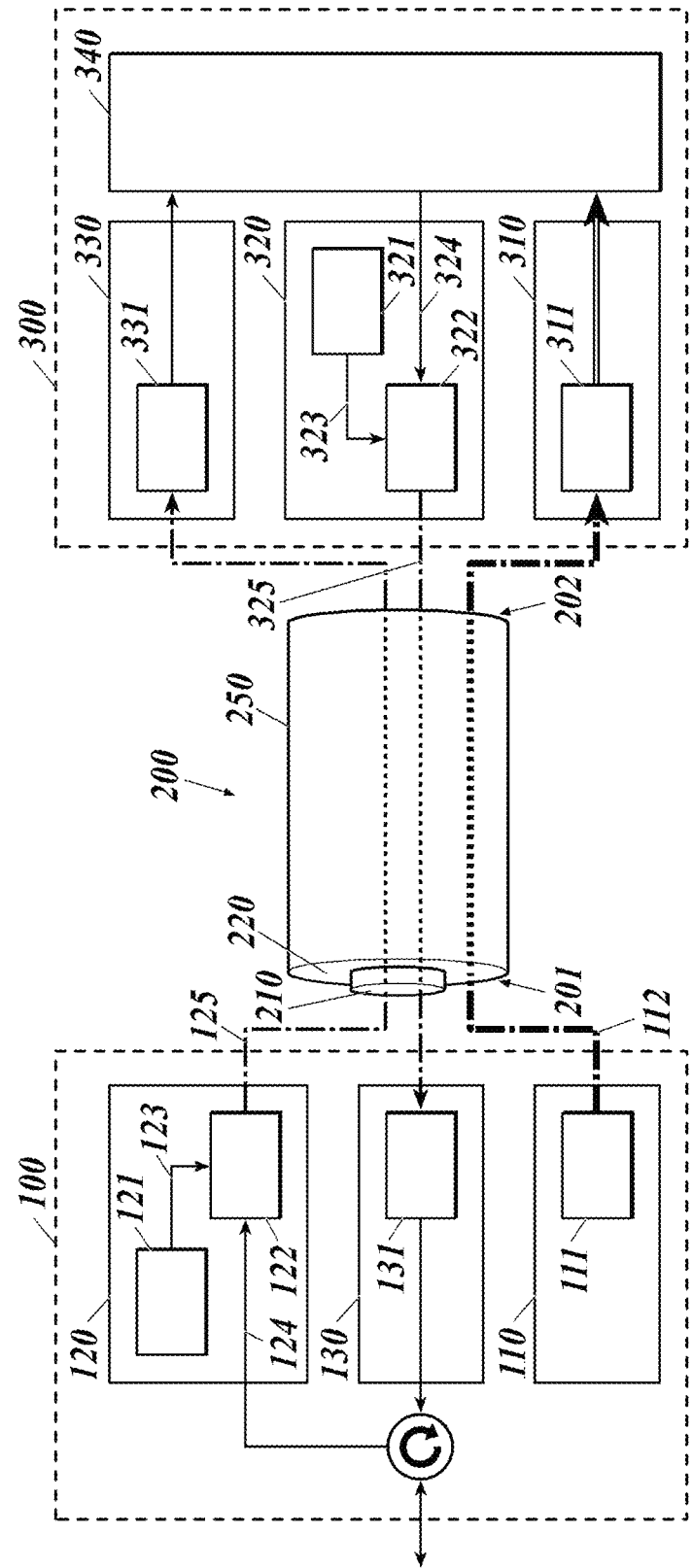
FIG. 2 is a block diagram of a power over fiber system according to a second embodiment of the present disclosure.

As shown in FIG. 2, a power over fiber (PoF) system 1 of this embodiment includes a power supply system through an optical fiber and an optical communication system therethrough, and includes: a first data communication device 100 including a power sourcing equipment (PSE) device 110; an optical fiber cable 200; and a second data communication device 300 including a powered device (PD) 310.

The PSE device 110 includes a semiconductor laser 111 for power supply. The first data communication device 100 includes, in addition to the PSE device 110, a transmitter 120 and a receiver 130 for data communication. The first data communication device 100 corresponds to a data terminal equipment (DTE) device, a repeater or the like. The transmitter 120 includes a semiconductor laser 121 for signals and a modulator 122. The receiver 130 includes a photodiode 131 for signals.

The optical fiber cable 200 includes an optical fiber 250 including: a core 210 that forms a transmission path of signal light; and a cladding 220 that is arranged so as to surround the core 210 and forms a transmission path of feed light.

The powered device 310 includes a photoelectric conversion element 311. The second data communication device 300 includes, in addition to the powered device 310, a transmitter 320 and a receiver 330 for data communication, and a data processing unit 340. The second data communication device 300 corresponds to a power end station or the like. The transmitter 320 includes a semiconductor laser 321 for signals and a modulator 322. The receiver 330 includes a photodiode 331 for signals. The data processing unit 340 processes received signals. The second data communication device 300 is a node in a communication network. The second data communication device 300 may be a node that communicates with another node.

The first data communication device 100 is connected to a power source, and electrically drives the semiconductor laser 111, the semiconductor laser 121, the modulator 122, the photodiode 131 and so forth. The first data communication device 100 is a node in a communication network. The first data communication device 100 may be a node that communicates with another node.

The semiconductor laser 111 oscillates with the electric power from the power source, thereby outputting feed light 112.

The photoelectric conversion element 311 converts the feed light 112 transmitted through the optical fiber cable 200 into electric power. The electric power obtained by the conversion of the feed light 112 by the photoelectric conversion element 311 is driving power needed in the second data communication device 300, for example, driving power for the transmitter 320, the receiver 330 and the data processing unit 340. The second data communication device 300 may be capable of outputting, for an external device(s), the electric power obtained by the conversion of the feed light 112 by the photoelectric conversion element 311.

The modulator 122 of the transmitter 120 modulates laser light 123 output by the semiconductor laser 121 to signal light 125 on the basis of transmission data 124, and outputs the signal light 125.

The photodiode 331 of the receiver 330 demodulates the signal light 125 transmitted through the optical fiber cable 200 to an electric signal, and outputs the electric signal to the data processing unit 340. The data processing unit 340 transmits data of the electric signal to a node, and also receives data from the node and outputs the data to the modulator 322 as transmission data 324.

The modulator 322 of the transmitter 320 modulates laser light 323 output by the semiconductor laser 321 to signal light 325 on the basis of the transmission data 324, and outputs the signal light 325.

The photodiode 131 of the receiver 130 demodulates the signal light 325 transmitted through the optical fiber cable 200 to an electric signal, and outputs the electric signal. Data of the electric signal is transmitted to a node, whereas data from the node is the transmission data 124.

The feed light 112 and the signal light 125 from the first data communication device 100 are input to one end 201 (first end) of the optical fiber cable 200, propagate through the cladding 220 and the core 210, respectively, and are output from the other end 202 (second end) of the optical fiber cable 200 to the second data communication device 300.

The signal light 325 from the second data communication device 300 is input to the other end 202 of the optical fiber cable 200, propagates through the core 210, and is output from the one end 201 of the optical fiber cable 200 to the first data communication device 100.

Figure 3:
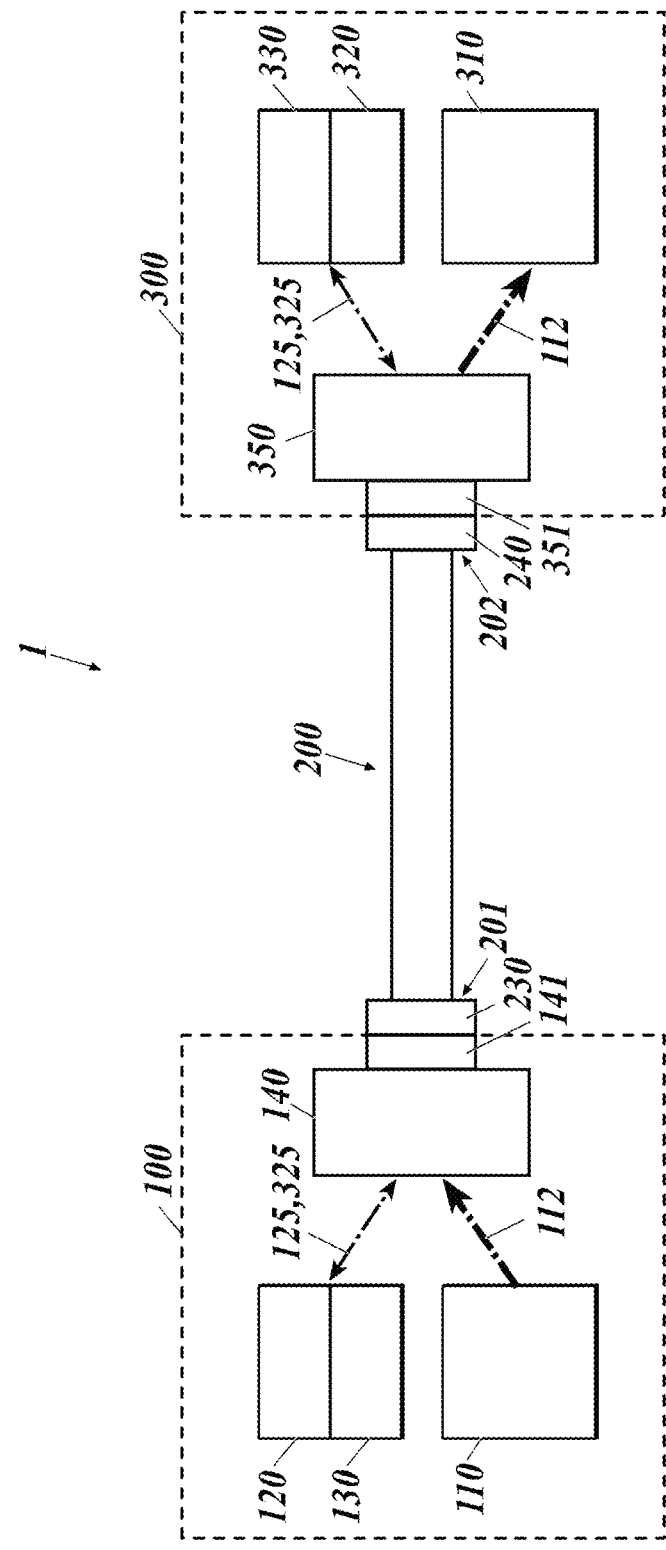
FIG. 3 is a block diagram of the power over fiber system according to the second embodiment of the present disclosure and shows optical connectors and so forth.

As shown in FIG. 3, the first data communication device 100 includes a light input/output part 140 and an optical connector 141 attached to the light input/output part 140, and the second data communication device 300 includes a light input/output part 350 and an optical connector 351 attached to the light input/output part 350. An optical connector 230 provided at the one end 201 of the optical fiber cable 200 is connected to the optical connector 141, and an optical connector 240 provided at the other end 202 of the optical fiber cable 200 is connected to the optical connector 351. The light input/output part 140 guides the feed light 112 to the cladding 220, guides the signal light 125 to the core 210, and guides the signal light 325 to the receiver 130. The light input/output part 350 guides the feed light 112 to the powered device 310, guides the signal light 125 to the receiver 330, and guides the signal light 325 to the core 210.

As described above, the optical fiber cable 200 has the one end 201 connectable to the first data communication device 100 and the other end 202 connectable to the second data communication device 300 to transmit the feed light 112. In this embodiment, the optical fiber cable 200 transmits the signal light 125/325 bidirectionally.

As the semiconductor materials of the semiconductor regions, which exhibit the light-electricity conversion effect, of the semiconductor laser 111 and the photoelectric conversion element 311, any of those described in the first embodiment can be used, thereby achieving a high optical power supply efficiency.

Figure 4:
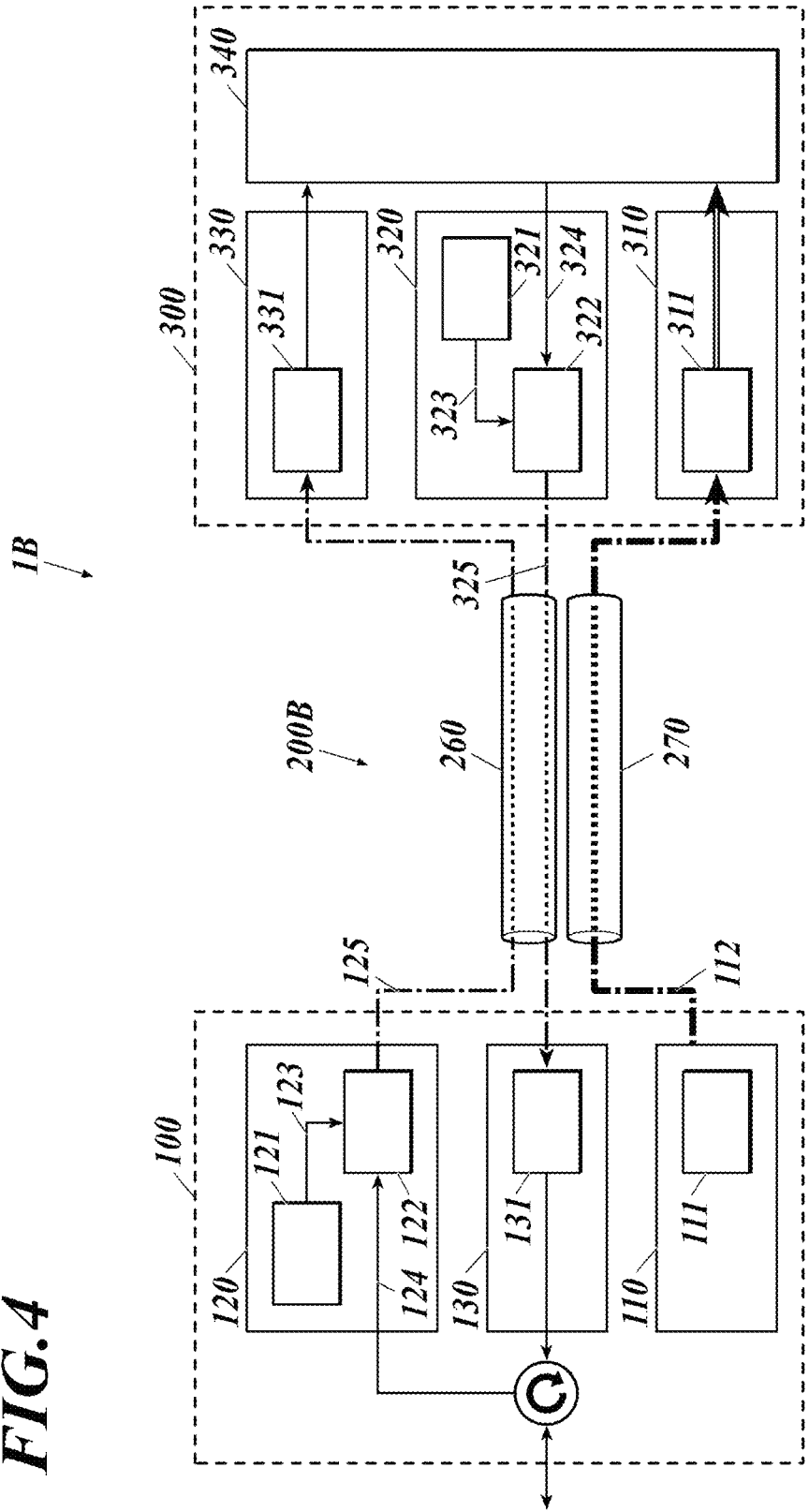
FIG. 4 is a block diagram of a power over fiber system according to another embodiment of the present disclosure.

Like an optical fiber cable 200B of a power over fiber system 1B shown in FIG. 4, an optical fiber 260 that transmits signal light and an optical fiber 270 that transmits feed light may be provided separately. Further, the optical fiber cable 200B may be composed of a plurality of optical fiber cables.

(2) Connection Establishment and Control of Feed Light

Next, connection establishment and control of feed light will be described with reference to FIG. 5 and FIG. 6 in addition to FIG. 2.

Figure 5:
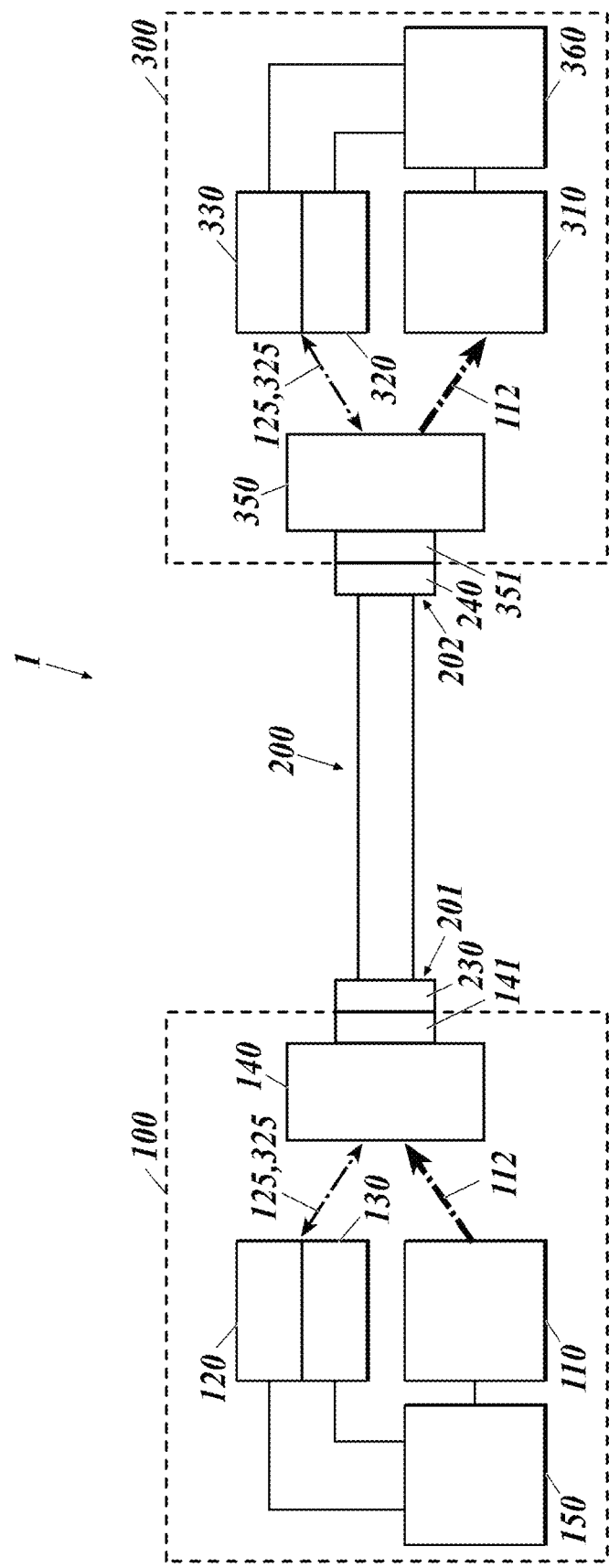
FIG. 5 is a block diagram of the power over fiber system shown in FIG. 3 with controllers shown.
Figure 6:
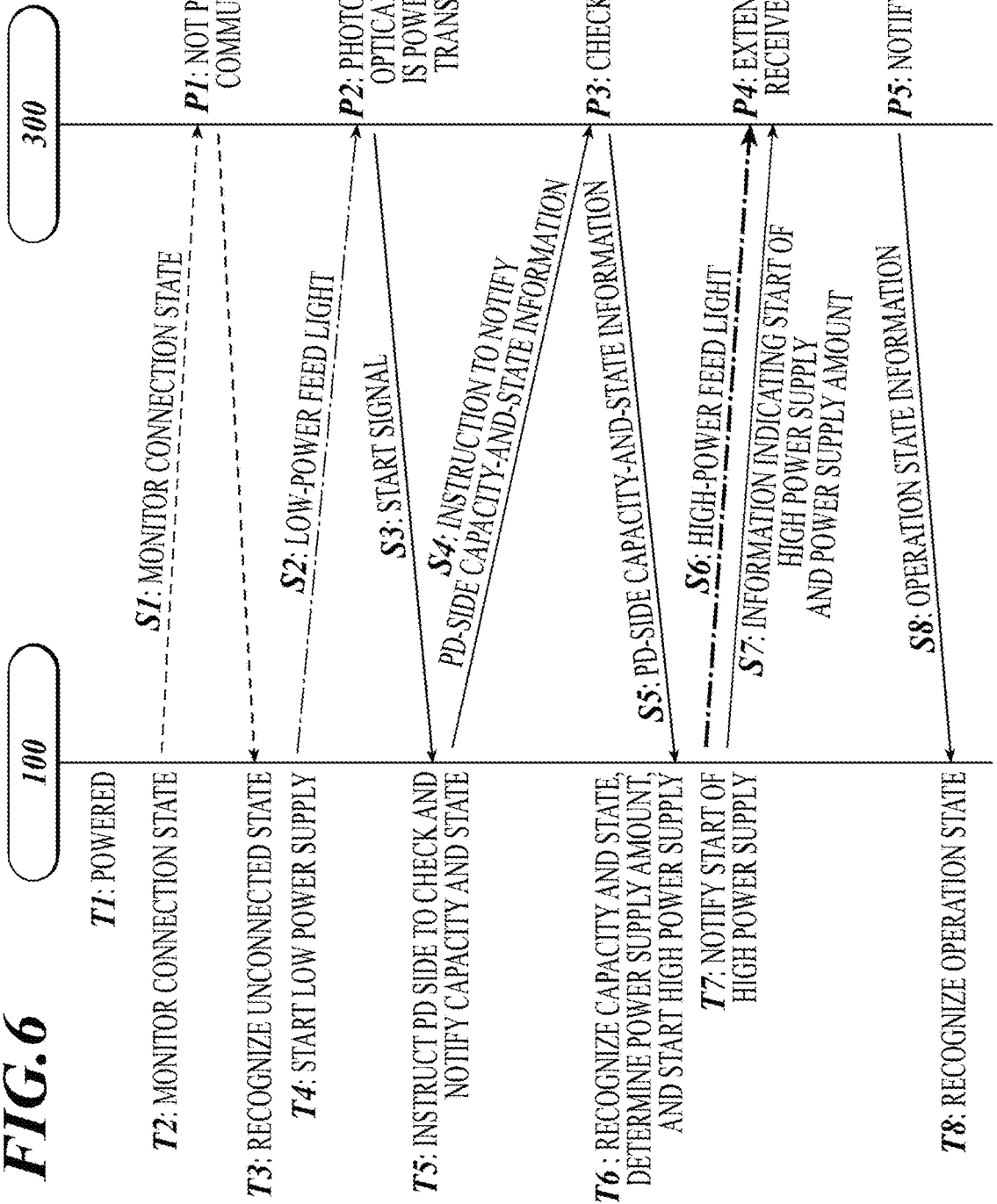
FIG. 6 is a flowchart showing a procedure of connection establishment and control of feed light.

In the power over fiber system 1 described as the second embodiment (configuration shown in FIG. 2 and FIG. 3), as shown in FIG. 5, the first data communication device 100 includes a controller 150, and the second data communication device 300 includes a controller 360. The controller 360 may be the same as the data processing unit 340 as hardware.

The controller 360 is also driven by the electric power obtained by the conversion performed by the photoelectric conversion element 311.

The controller 150 of the first data communication device 100 is capable of controlling low power supply and high power supply that are performed by the PSE device 110. Feed energy by high power supply exceeds feed energy by low power supply.

Explanation will be made with reference to the flowchart shown in FIG. 6.

After powered (T1), the controller 150 of the first data communication device 100 monitors data communication devices connected to its ports (T2, S1). The data communication devices include the second data communication device 300 shown in FIG. 5.

Assume that the second data communication device 300 is currently in a power-off state and has not yet established connection communication with the first data communication device 100 (P1).

The controller 150 of the first data communication device 100 starts optical power supply to the second data communication device 300 in response to, for example, an operation signal input to the first data communication device 100. For that, the controller 150 searches for the connection port of the second data communication device 300 and checks the connection state. At this point, the controller 150 recognizes that the second data communication device 300 is in the unconnected state (T3).

Because the controller 150 of the first data communication device 100 has recognized that the second data communication device 300 is in the unconnected state, the controller 150 first starts low power supply to the second data communication device 300 (T4), thereby supplying low-power feed light (S2) to the second data communication device 300.

The controller 150 of the first data communication device 100 starts low power supply (T4) and waits for a start signal from the second data communication device 300. The start signal indicates that a photoelectric-conversion-and-optical-communication unit (310, 320, 330, 360) of the second data communication device 300 has started. The photoelectric-conversion-and-optical-communication unit (310, 320, 330, 360) indicates functional parts of the second data communication device 300 that perform photoelectric conversion and optical communication, and includes the powered device 310, the transmitter 320, the receiver 330 and the controller 360.

When the photoelectric-conversion-and-optical-communication unit (310, 320, 330, 360) receives low-power feed light (S2), the photoelectric conversion element 311 operates, whereby the photoelectric-conversion-and-optical-communication unit (310, 320, 330, 360) is energized and starts (P2). When the controller 360 of the second data communication device 300 starts, the controller 360 transmits the start signal (S3) through the transmitter 320 to the first data communication device 100 (P2).

When receiving the start signal (S3), the controller 150 of the first data communication device 100 instructs the second data communication device 300 to notify the first data communication device 100 about information for determining the power supply amount in high power supply (T5, S4). This information (in this embodiment, capacity-and-state information on the PD side, which is hereinafter called "PD-side capacity-and-state information") includes information on the power receiving capacity (photoelectric conversion capacity) of the powered device 310, the state of the second data communication device 300, such as temperature in the second data communication device 300, and devices (components) that receive electric power from the powered device 310.

The "devices that receive electric power from the powered device 310" indicate not the photoelectric-conversion-and-optical-communication unit (310, 320, 330, 360) but devices including devices that do not receive electric power from the powered device 310 in P2. Expected examples of the devices that receive electric power from the powered device 310 include: output devices, such as an image display; input devices, such as a sensor and a camera; and a radio wave communication device. These devices may be incorporated in the second data communication device 300 or provided as external devices.

The controller 360 of the second data communication device 300 checks the present conditions of the capacity of the powered device 310 and the maximum range to which the powered device 310 supplies electric power, and transmits the PD-side capacity-and-state information (S5) to the first data communication device 100 (P3).

The controller 150 of the first data communication device 100 receives the PD-side capacity-and-state information (S5) (T6), and on the basis of the PD-side capacity-and-state information (S5), determines the power supply amount and controls high power supply (T6, S6). At the same time as sending out the determined power supply amount of high-power feed light (S6), the controller 150 transmits information indicating the start of high power supply and the determined power supply amount (T7).

As described above, the controller 150 of the first data communication device 100 monitors the state of the second data communication device 300, starts low power supply after recognizing that the second data communication device 300 is in the unconnected state (no-power-supplied state), and enables (allows) high power supply after receiving the start signal (S3). That is, the controller 150 performs control not to shift to high power supply without receiving the start signal (S3). Thus, unless communication connection is established, high power supply of the PSE device 110 does not start. For example, when the optical connector 240 is not connected, high power supply of the PSE device 110 does not start. This can prevent high-power feed light from being released to the outside.

In this embodiment, the controller 150 receives the start signal (S3) and the PD-side capacity-and-state information (S5), determines the power supply amount, and starts high power supply. Alternatively, when receiving the start signal (S3), the controller 150 may start high power supply with a predetermined power supply amount. Still alternatively, the controller 360 of the second data communication device 300 may transmit the PD-side capacity-and-state information (S5) when it starts, instead of communicating the start signal (S3) and the PD-side capacity-and-state information (S5) separately. The start signal (S3) is not limited in its form as long as it substantially indicates that the second data communication device 300 has started. Hence, the PD-side capacity-and-state information (S5) may double as the start signal (S3).

When receiving high power supply (S6, S7), the controller 360 of the second data communication device 300 enables (allows) extension of the range of targets that receive electric power from the powered device 310. In this embodiment, the controller 360 actually extends the range of the targets that receive electric power from the powered device 310 (P4). Before receiving high power supply (S6, S7), the controller 360 disables (does not allow) such extension. This can prevent shortage of electric power in the photoelectric-conversion-and-optical-communication unit (310, 320, 330, 360).

The extended range of the targets includes, for example, the abovementioned output devices, input devices and radio communication device. These devices are devices to which power is not supplied (devices that are not started) in the state of low power supply. The controller 360 starts up these devices (P4). When there is no device to be started, the controller 360 leaves the range of the targets as it is. The controller 360 supplies electric power to later-connected devices, thereby starting up the devices, when electric power supply is still available.

The controller 360 notifies the first data communication device 100 about the operation state of the devices (S8) (P5). The controller 150 receives this operation state (T8), and then further optical communication is performed between the first data communication device 100 and the second data communication device 300. The controller 150 monitors the state of the second data communication device 300 and the communication state, and controls the power supply amount as needed. For example, the controller 150 changes the power supply amount or stops power supply.

Thus, feed electric power by low power supply can be limited and reduced to the minimum electric power that can drive the photoelectric-conversion-and-optical-communication unit (310, 320, 330, 360).

Feed electric power by high power supply exceeds feed electric power by low power supply, and can be in the range from more than the feed electric power by low power supply to feed electric power corresponding to the highest power of the PSE device 110. High power supply does not always indicate the highest power of the PSE device 110, and the power supply amount is determined, as described above, in accordance with the information from the PD side.

In low power supply and high power supply, feed light may be pulsed light, and feed electric power may be controlled by pulse width modulation (PWM).

The highest value of light intensity of feed light in low power supply may be set to be lower than the highest value of light intensity of feed light in high power supply in order that light intensity of feed light instantaneously emitted in low power supply can be lower than that in high power supply, so that safety can be ensured.

Alternatively, the highest value of light intensity of feed light in low power supply may be set to be equal to the highest value of light intensity of feed light in high power supply. In this case too, a certain level of safety can be ensured by decreasing the duty cycle and somewhat increasing the pulse frequency in low power supply, thereby reducing the amount of light emitted per unit time in low power supply.

Still alternatively, feed light may be not pulsed light but continuous light, and the value of light intensity of feed light in low power supply may be set to be lower than the value of light intensity of feed light in high power supply.

Although some embodiments of the present disclosure have been described above, these embodiments are made for purposes of illustration and example only. The present invention can be carried out in various other forms, and each component may be omitted, replaced or modified without departing from the scope of the present invention.

For example, in the above (2), the information for determining the power supply amount in high power supply is the PD-side capacity-and-state information (S5), but may be information specifying the power supply amount (5 W, 10 W, 20 W, etc.) from the second data communication device 300. Further, after extension of the range of the targets that receive electric power (P4) too, the second data communication device 300 may transmit the information specifying the power supply amount (which may be an instruction to stop power supply) so that the power supply amount is controlled.

A power over fiber system according to at least one embodiment of the present disclosure includes: a first data communication device including a power sourcing equipment device including a semiconductor laser that oscillates with electric power, thereby outputting feed light; a second data communication device including a powered device including a photoelectric conversion element that converts the feed light into electric power, the second data communication device performing optical communication with the first data communication device; and an optical fiber cable including a first end connectable to the first data communication device and a second end connectable to the second data communication device to transmit the feed light and signal light, wherein the first data communication device is capable of controlling low power supply and high power supply that are performed by the power sourcing equipment device, feed electric power by the high power supply exceeding feed electric power by the low power supply, wherein the first data communication device enables the high power supply after starting the low power supply to the second data communication device and receiving, from the second data communication device, a start signal indicating that a photoelectric-conversion-and-optical-communication unit of the second data communication device has started, and wherein the photoelectric-conversion-and-optical-communication unit includes the powered device, and starts and transmits the start signal to the first data communication device when receiving the low power supply, and enables extension of a range of a target that receives electric power from the powered device when receiving the high power supply.

The power over fiber system according to at least one embodiment of the present disclosure can prevent high-power feed light from being released to the outside, and can perform optical power supply with a proper balance between the power supply amount and the power consumption.

What is claimed is:

1. A power over fiber system, comprising:
a first data communication device including a power sourcing equipment device including a semiconductor laser that oscillates with electric power, thereby outputting feed light;
a second data communication device including a powered device including a photoelectric conversion element that converts the feed light into electric power, the second data communication device performing optical communication with the first data communication device; and
an optical fiber cable including a first end connectable to the first data communication device and a second end connectable to the second data communication device to transmit the feed light and signal light,
wherein the first data communication device is configured to control low power supply and high power supply that are performed by the power sourcing equipment device, feed electric power by the high power supply exceeding feed electric power by the low power supply,
wherein, before enabling the high power supply, the first data communication device starts the low power supply to the second data communication device,
wherein the second data communication device transmits information specifying the power supply amount to the first data communication device upon receiving the low power supply,
wherein, upon receiving the information from the second data communication device, the first data communication device enables the high power supply, and
wherein the second data communication device enables extension of a range of a target that receives electric power from the powered device upon receiving the high power supply.

2. The power over fiber system according to claim 1, wherein a semiconductor material of a semiconductor region of the semiconductor laser is a laser medium having a laser wavelength of 500 nm or less, the semiconductor region exhibiting a light-electricity conversion effect.

* * * * *